(12) United States Patent
Li et al.

(10) Patent No.: US 11,461,447 B2
(45) Date of Patent: *Oct. 4, 2022

(54) ECHOPRINT USER AUTHENTICATION

(71) Applicant: Futurewei Technologies, Inc., Plano, TX (US)

(72) Inventors: Changzhu Li, Beijing (CN); Shuang Wu, Mountain View, CA (US)

(73) Assignee: Futurewei Technologies, Inc., Addison, TX (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/104,532

(22) Filed: Nov. 25, 2020

(65) Prior Publication Data
US 2021/0150009 A1    May 20, 2021

Related U.S. Application Data

(63) Continuation of application No. 15/873,384, filed on Jan. 17, 2018, now Pat. No. 10,853,463.

(51) Int. Cl.
*G06F 21/32* (2013.01)
*H04L 9/32* (2006.01)
(Continued)

(52) U.S. Cl.
CPC ............ *G06F 21/32* (2013.01); *G06F 21/316* (2013.01); *G06N 20/00* (2019.01); *G10L 19/018* (2013.01); *H04K 1/00* (2013.01); *H04L 9/3231* (2013.01)

(58) Field of Classification Search
CPC ....... G06F 21/32; G06F 21/316; G06N 20/00; G10L 19/018; H04K 1/00; H04L 9/3231
(Continued)

(56) References Cited

U.S. PATENT DOCUMENTS 7,158,776 B1 ‡ 1/2007 Estes ...................... H04L 63/02
380/24
8,437,729 B2 * 5/2013 Ewell, Jr. ................ H04M 1/66
455/404.1
(Continued)

FOREIGN PATENT DOCUMENTS

| CN | 105635087 A | ‡ | 6/2016 |
| CN | 105635087 A |   | 6/2016 |

(Continued)

OTHER PUBLICATIONS

Song et al., "Cardiac Scan: A Non-Contact and Continuous Heart-Based User Authentication System", MobiCom'17, Oct. 16-20, 2017, Snowbird, Utah, USA.‡
(Continued)

*Primary Examiner* — Dereena T Cattungal
(74) *Attorney, Agent, or Firm* — Vierra Magen Marcus LLP

(57) ABSTRACT

A device and method providing audio-based, continuous authentication of a user to provide access to a processing device. A user echoprint model is created while a user interacts with an authentication interface for another authentication method of the device, transparently to the user. The sound waves are user-specific and inaudible. The user-specific sounds are reflected by the user and used to construct an echoprint which can be compared by a previously constructed user-specific, echoprint model. If the result is positive, access to the processing device may be allowed. Access to the processing device is based on the audio authentication or the alternative authentication is based on the result of audio authentication and updates a device state indicating whether the display is on or off and whether the device is locked or unlocked.

17 Claims, 10 Drawing Sheets

(51) Int. Cl.
*H04K 1/00* (2006.01)
*G10L 19/018* (2013.01)
*G06F 21/31* (2013.01)
*G06N 20/00* (2019.01)

(58) Field of Classification Search
USPC .......................................................... 726/19
See application file for complete search history.

(56) References Cited

U.S. PATENT DOCUMENTS

| | | | |
|---|---|---|---|
| 9,286,902 B2 ‡ | 3/2016 | Han | G10L 19/018 |
| 11,265,315 B2 * | 3/2022 | Ota | H04L 63/12 |
| 2010/0197351 A1 ‡ | 8/2010 | Ewell, Jr. | H04M 1/66 |
| | | | 455/565 |
| 2012/0245941 A1 ‡ | 9/2012 | Cheyer | G06F 21/32 |
| | | | 704/246 |
| 2013/0227678 A1 ‡ | 8/2013 | Kang | G06F 21/32 |
| | | | 726/19 |
| 2014/0172430 A1 ‡ | 6/2014 | Rutherford | G06F 3/167 |
| | | | 704/273 |
| 2014/0297528 A1 ‡ | 10/2014 | Agrawal | G06Q 20/40145 |
| | | | 705/44 |
| 2015/0033305 A1 | 1/2015 | Shear et al. | |
| 2015/0381617 A1 ‡ | 12/2015 | Jung | G06K 9/00087 |
| | | | 455/411 |
| 2016/0313366 A1 ‡ | 10/2016 | Sudow | G01C 9/02 |
| 2016/0316366 A1 ‡ | 10/2016 | Takenouchi | G10L 17/22 |
| 2017/0199997 A1 ‡ | 7/2017 | Fadell | G06F 21/32 |
| 2017/0316194 A1 ‡ | 11/2017 | Wang | G06F 21/84 |
| 2018/0131692 A1 * | 5/2018 | Katz-Oz | G06F 21/32 |
| 2018/0144346 A1 * | 5/2018 | Yu | G10L 15/22 |
| 2018/0174590 A1 * | 6/2018 | Kurian | G10L 17/20 |
| 2018/0233152 A1 * | 8/2018 | Olaya | G10L 15/22 |

FOREIGN PATENT DOCUMENTS

| | | | | |
|---|---|---|---|---|
| EP | 3156978 A1 | 4/2017 | | |
| WO | 2017113370 A1 | 7/2017 | | |
| WO | WO-2017113370 A1 ‡ | 7/2017 | ............ | G06F 3/048 |

OTHER PUBLICATIONS

Chauhan et al., "BreathPrint: Breathing Acoustics-based User Authentication", MobiSys '17, Proceedings of the 15th Annual International Conference on Mobile Systems, Applications, and Services, Jun. 19-23, 2017, pp. 278-291, Niagara Falls, NY, USA.‡

Gwen Morgan, "How Bats Stay on Target: Bio Sonar", National Science Foundation, Live Science, Research in Action, Aug. 17, 2011. https://www.livescience.com/15616-bats-sonar-sounds-nsf-ria.html.‡

International Search Report dated Apr. 16, 2019, in PCT Patent Application No. PCT/CN2019/071521, 9 pages.‡

Linghan Zhang et al., "Hearing Your Voice is Not Enough: An Articulatory Gesture Based Liveness Detection for Voice Authentication",CCS'17, Oct. 30-Nov. 3, 2017, Dallas, TX, USA,Session A2: Human Authentication,total 15 pages.‡

European Search Report dated Jan. 18, 2021, European Application No. 19741323.0.

Non-Final Office Action dated Jan. 24, 2020, U.S. Appl. No. 15/873,384.

Response to Non-Final Office Action dated Apr. 23, 2020, U.S. Appl. No. 15/873,384.

Supplemental Response to Non-Final Office Action dated Jul. 14, 2020, U.S. Appl. No. 15/873,384.

Notice of Allowance dated Jul. 23, 2020, U.S. Appl. No. 15/873,384.

\* cited by examiner
‡ imported from a related application

ECHOPRINT USER AUTHENTICATION

CLAIM OF PRIORITY

This application claims the benefit of priority to U.S. application Ser. No. 15/873,384, filed Jan. 17, 2018, and the entire contents of which are hereby incorporated by reference.

BACKGROUND

Various authentication mechanisms are currently utilized to prevent unauthorized access to processing devices such as personal computers and mobile devices. Password-based logins have given way to biometric forms of authentication such as fingerprint readers and facial recognition. Current biometric forms of authentication generally require some special form of biometric sensors be coupled to the processing device.

BRIEF SUMMARY

One general aspect of the present disclosure includes a processing device having audio-based authentication, including: a display; a microphone; a speaker; an audio signal generator coupled to the speaker adapted to output a user-specific inaudible sound to the speaker; a signal processor coupled to the microphone adapted to isolate reflections of the user-specific inaudible sound signal and create an echoprint based on the reflections; and a processor configured to compare the test echoprint with a user-specific echoprint model associated with the user; perform an alternative authentication operation to authenticate the user based on the comparison; and update a device state according to the comparison or the alternative authentication operation performed, with the device state comprising whether the display is on or off and whether the device is locked or unlocked Optionally, in any of the preceding aspects the device includes a machine learning processor is adapted to create the user-specific echoprint during an alternative authentication set-up procedure. Optionally, in any of the preceding aspects the echoprint identifies features associated with the user, such features including at least biometric features or behavioral features. Optionally, in any of the preceding aspects the biometric features include at least physical attributes or cardiac attributes. Optionally, in any of the preceding aspects the machine learning processor is adapted to build the user-specific echoprint model during a period less than or equal to beginning when a user enables authentication through when a user selects to enable audio-based authentication. Optionally, in any of the preceding aspects the signal processor is adapted to build the user-specific echoprint during a period between entry of a password entry user interface through a user-interface prompt suggesting the user enable audio-based authentication. Optionally, in any of the preceding aspects, the device further includes a non-volatile storage device adapted to store one or more echoprints generated by the signal processor as a training data set and the user-specific echoprint model. Optionally, in any of the preceding aspects the machine learning processor is adapted to receive user feedback on authentication recognition and update the user-specific echoprint model based on the feedback. Optionally, in any of the preceding aspects the audio signal generator and signal processor are adapted to operate while the display is on and the device is locked, and are adapted to remain in standby when the display is off and the device is locked.

Another general aspect includes a processor-implemented method of authenticating user access to a processing device having a display, including: generating a user-specific echoprint model using a machine learning process by outputting an inaudible sound signal at a user-specific frequency from a speaker associated with the processing device, and receiving reflections of the inaudible sound signal at a microphone associated with the processing device while the user interacts with an alternative authentication user interface; authenticate the user access when the display is on by generating a test echoprint by outputting an inaudible test sound signal at a user-specific frequency from the speaker, and receiving reflections of the inaudible test sound signal at the microphone; comparing the test echoprint with the user-specific echoprint model to determine whether to allow the user to access the processing device; performing an alternative authentication method based on the comparison; and allowing or denying access to the processing device based on the testing by updating a device state according to the comparing or the alternative authentication operation performed, the device state comprising whether the display is on or off and whether the device is locked or unlocked.

Optionally, in any of the preceding aspects the generating a test echoprint, the receiving reflections of the inaudible test sound signal, and the testing occur while the display is on and the device is locked, and do not occur when the display is off or the device is locked. Optionally, in any of the preceding aspects the outputting and receiving for generating the user-specific echoprint model are repeated a plurality of times to create a training dataset for a machine learning process. Optionally, in any of the preceding aspects the testing outputs a different user-specific inaudible test sound signal upon an authentication failure, and the testing isolates reflections of the different user-specific inaudible test sound signal and creates a new test echoprint based on the reflections of the different user-specific inaudible test sound signal. Optionally, in any of the preceding aspects the generating comprises identifying features associated with the user, such features including at least biometric features or behavioral features. Implementations of the described techniques may include hardware, a method or process, or computer software on a computer-accessible medium.

Another aspect includes a non-transitory computer-readable medium storing computer instructions, that when executed by one or more processors, cause the one or more processors to perform the steps of: generate an echo-print model for a user by: generating an echoprint model for a user by: outputting an inaudible sound signal at a user-specific frequency from a speaker associated with the processor; receiving reflections of the inaudible sound signal; generating an echo-print based on the reflections and associating the echo-print with a user; repeating the outputting, receiving and generating to create training data. The non-transitory computer-readable medium also includes authenticating a user to provide access to a processing device having a display, by, when the display device is on and the device is locked: outputting a test inaudible sound signal at the user-specific frequency from a speaker associated with the processing device; receiving reflections of the test inaudible sound signal; generating at least one test echo-print based on the reflections of the test inaudible sound signal; comparing the echoprint by a user-specific echoprint model to determine whether to allow the user to access the processing device; performing an alternative authentication method based on the comparing; and allow or denying access to the processing device based on the testing and the alternative authentication method by updating a device state according to the comparing or the alternative authentication operation performed, the device state comprising whether the display is on or off and whether the device is locked or unlocked.

Optionally, in any of the preceding aspects, the non-transitory computer-readable medium storing computer instructions includes instructions where outputting a user-specific inaudible sound includes outputting a different test user-specific inaudible sound and the signal processor adapted to isolate reflections of the different test user-specific inaudible sound and create an echoprint based on the reflections. Optionally, in any of the preceding aspects, the non-transitory computer-readable medium storing computer instructions includes instructions where each outputting sends the user-specific inaudible signal. Optionally, in any of the preceding aspects the non-transitory computer-readable medium storing computer instructions includes instructions which cause the one or more processors to update the user-specific echoprint model using a machine learning process based on user feedback of whether the testing was accurate. Optionally, in any of the preceding aspects, the non-transitory computer-readable medium storing computer instructions includes instructions where the echoprint identifies features associated with the user, such features including at least biometric features or behavioral features. Optionally, in any of the preceding aspects, the non-transitory computer-readable medium storing computer instructions includes instructions wherein the biometric features include at least physical attributes, or cardiac attributes.

BRIEF DESCRIPTION OF THE DRAWINGS

Aspects of the present disclosure are illustrated by way of example and are not limited by the accompanying figures for which like references indicate like elements.

DETAILED DESCRIPTION

Technology is presented which enables an audio-based, continuous authentication of a user to provide access to a processing device. The audio-based authentication uses sound waves generated and received by standard components usually found in processing devices, enabling incorporation of the technology into existing devices as well as new devices. Speakers associated with or incorporated into a processing device emit a user-specific inaudible sound. The user-specific sounds are reflected by the user and used to construct an "echo" print (an audio signature incorporating various biometric and behavioral features associated with the user) which is tested by a well-trained echoprint model. If the test result is positive, access to the processing device may be allowed.

In one aspect, training of the echo print model may occur while the user interacts with a user interface to enable an alternative form of authentication, such as password-based authentication. In this aspect, the device may emit user-specific inaudible sound while the user is creating a password and train the echoprint model, then prompt the user to enable an audio authentication system, also referred to herein as "EchoID."

Access to any processing device, or resource on a processing device, may be restricted until an authorized user authenticates. The audio authentication system may be combined with any suitable alternative authentication system. In some embodiments, the alternative authentication system may include a system for detecting biometric features or attributes of a user. For example, the processing device may include a biometric fingerprint system operative to detect and authenticate a user based on features of or under a user's skin.

The processing device 100 may provide any suitable combination of authentication systems, including for example biometric authentication systems and/or pattern-based authentication systems (such as passcode authentication).

Figure 1:
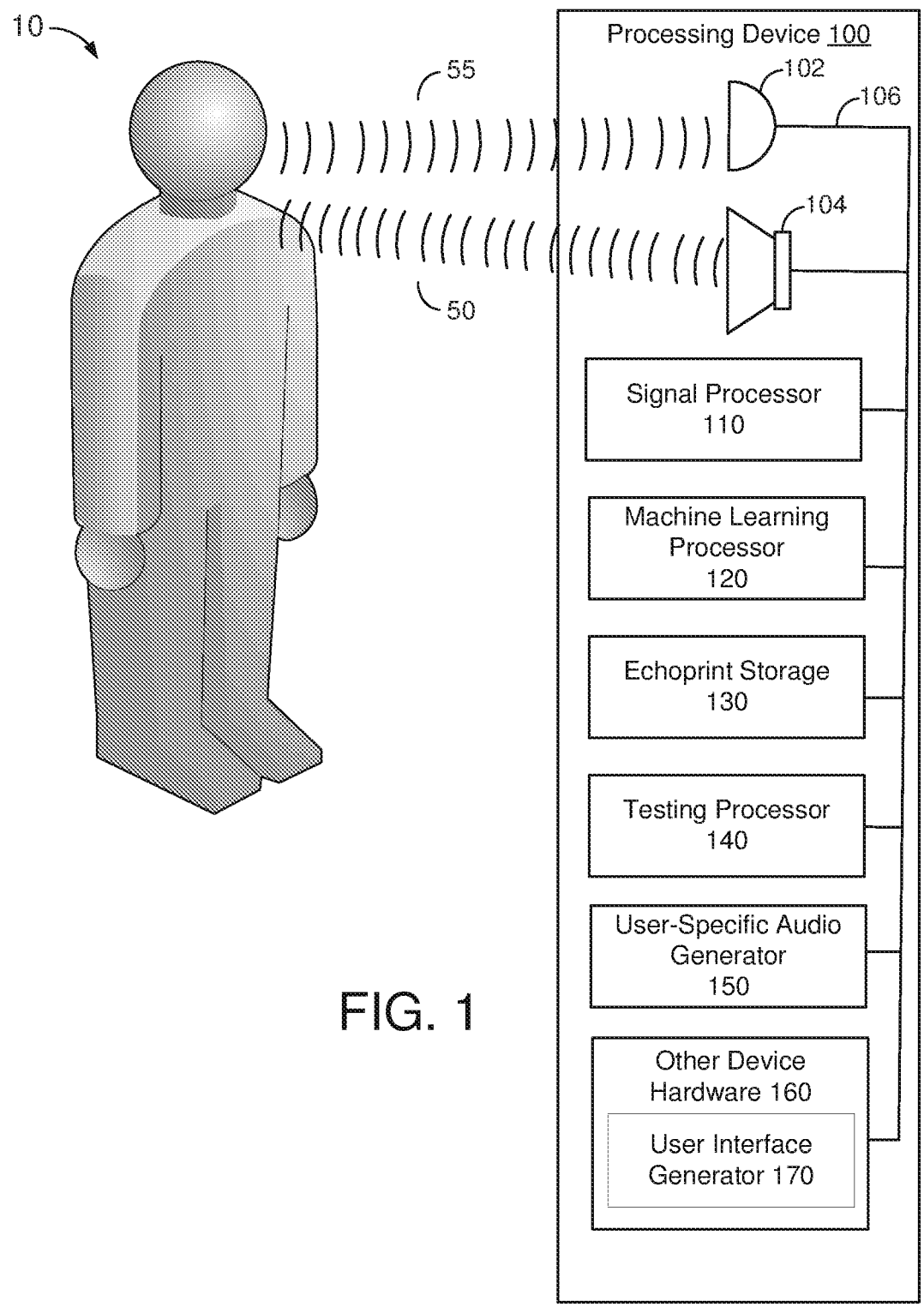
FIG. 1 illustrates a first embodiment of a processing device illustrating an overview of the present technology using audio signals and echoprints to authenticate user access to a processing device.
Figure 8:
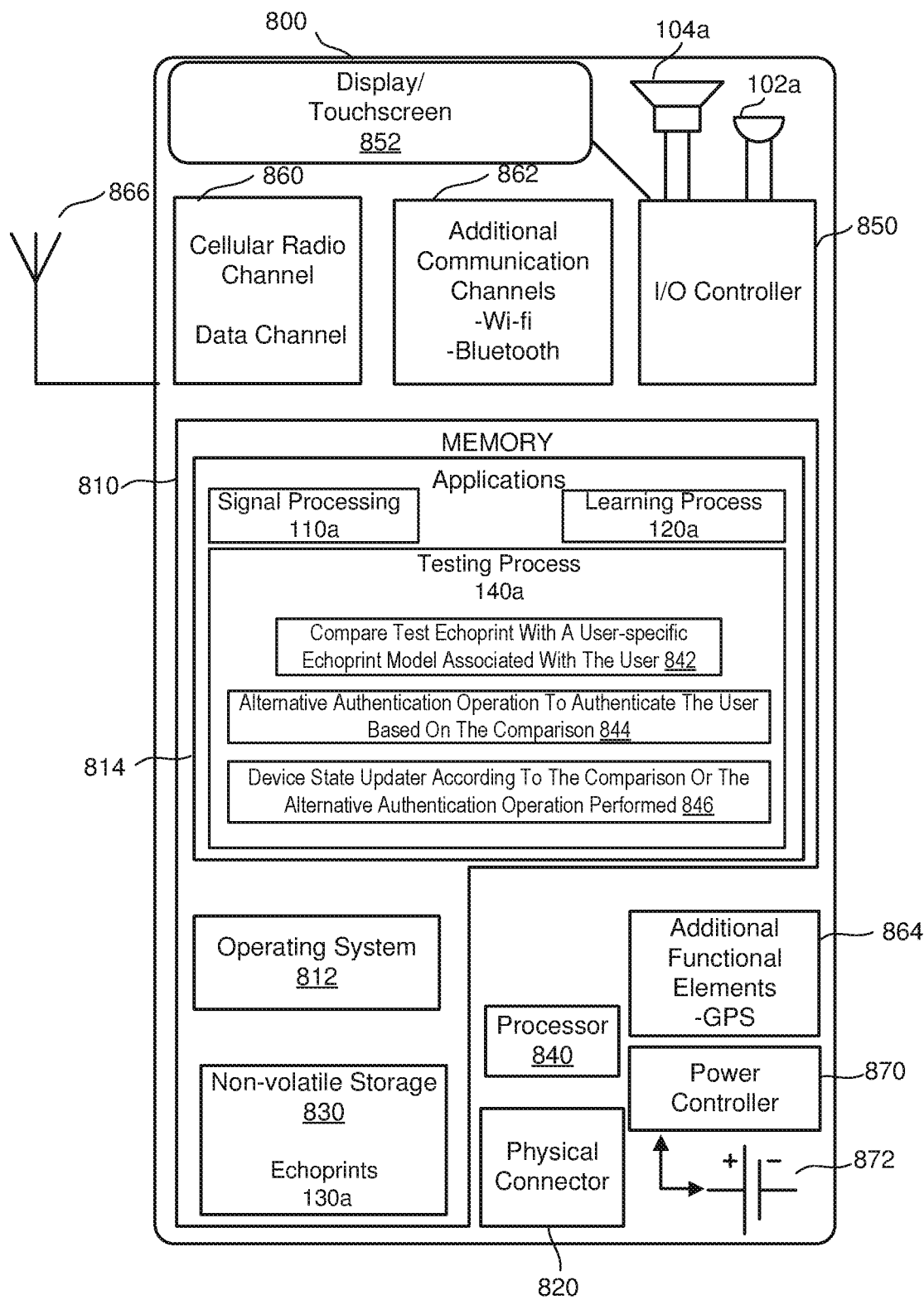
FIG. 8 illustrates a mobile processing device in accordance with the present technology.

FIG. 1 illustrates a processing device 100 suitable for implementing audio-based authentication interacting with a user 10. Processing device 100 may include a microphone 102, a speaker 104 and other components connected by a bus 106. As illustrated in FIG. 1, the components of the processing device 100 include signal processor 110, a machine learning processor 120, an echo signature storage device 130, a testing processor 140, and a user-specific audio generator 150. Other device hardware 160 may be provided in the processing device, including a user-interface generator 170 creating and outputting various user interfaces to a display, as described herein. Specific examples of processing device 100 are illustrated in FIG. 8. In processing device 100, an audio-based authentication of a user 10 may be performed by first causing the user-specific audio generator 150 to generate a user-specific inaudible audio signal 50, which is output from the speaker 104. The user-specific inaudible sound may be in the audible frequency range, but at a volume which is too low for the human ear, or in the infrasound or ultrasound frequency range. Reflections 55 of the user-specific inaudible audio 50 are received by and detected by the microphone 102 and provided to signal processor 110. Signal processor 110 processes the reflected audio 55 (or "echos") and creates an echoprint. The echoprint may comprise an audio signature in which a combination of various biometric and behavioral features derived from the reflections 55 are identified. When is tested by a user-specific echoprint model which identifies those features of the signature which can be matched to an individual user, reflections 55 can be used to identify and authenticate user 10.

The user-specific audio signal may be designed to comprise a signal which is emitted from the speaker which has a high statistical probability of being unique to that user's processing device relative to another processing device which may be nearby. This may be achieved by creating the user-specific audio signal with randomized elements in the signal, including elements of time, frequency and/or amplitude, or any other variation of an audio signal which may be emitted by the speaker 104.

An echoprint storage device 130 is a nonvolatile storage device which can be accessed by the processors in order to perform the functions described herein. The testing processor 140 tests the newly received reflections during an authentication process to an echoprint user model to perform an authentication. The echoprint user model is created by the machine learning processor 120, as described herein. The machine learning processor 120 can access feedback from authentication events to improve the echoprint user model.

Each of the processors illustrated in FIG. 1 may be implemented as separate processors dedicated to providing the functions described herein implemented by a dedicated hardware processor, a programmable processor including a combination of hardware and instructions operable to cause the processor to perform the described functions, or as a general purpose single processor executing instructions operable to instruct a single processor to perform the described functions. Thus, as illustrated in FIG. 8, each of the "processors" illustrated in FIG. 1 may be implemented as a process created by executing the instructions operable to instruct one or more processors to perform the functions associated with the processor of FIG. 1.

In order to implement security on a processing device, generally a user is provided with an opportunity to select the type of authentication the user wishes to use with the processing device. Various forms of alternative authentication may be utilized with audio-based authentication described herein. The technology provides an easily usable form of authentication using hardware already incorporated into most mobile devices, such as a speaker and microphone. The technology is also unobtrusive to the user, using an inaudible sound signal to perform authentication.

Figure 2A:
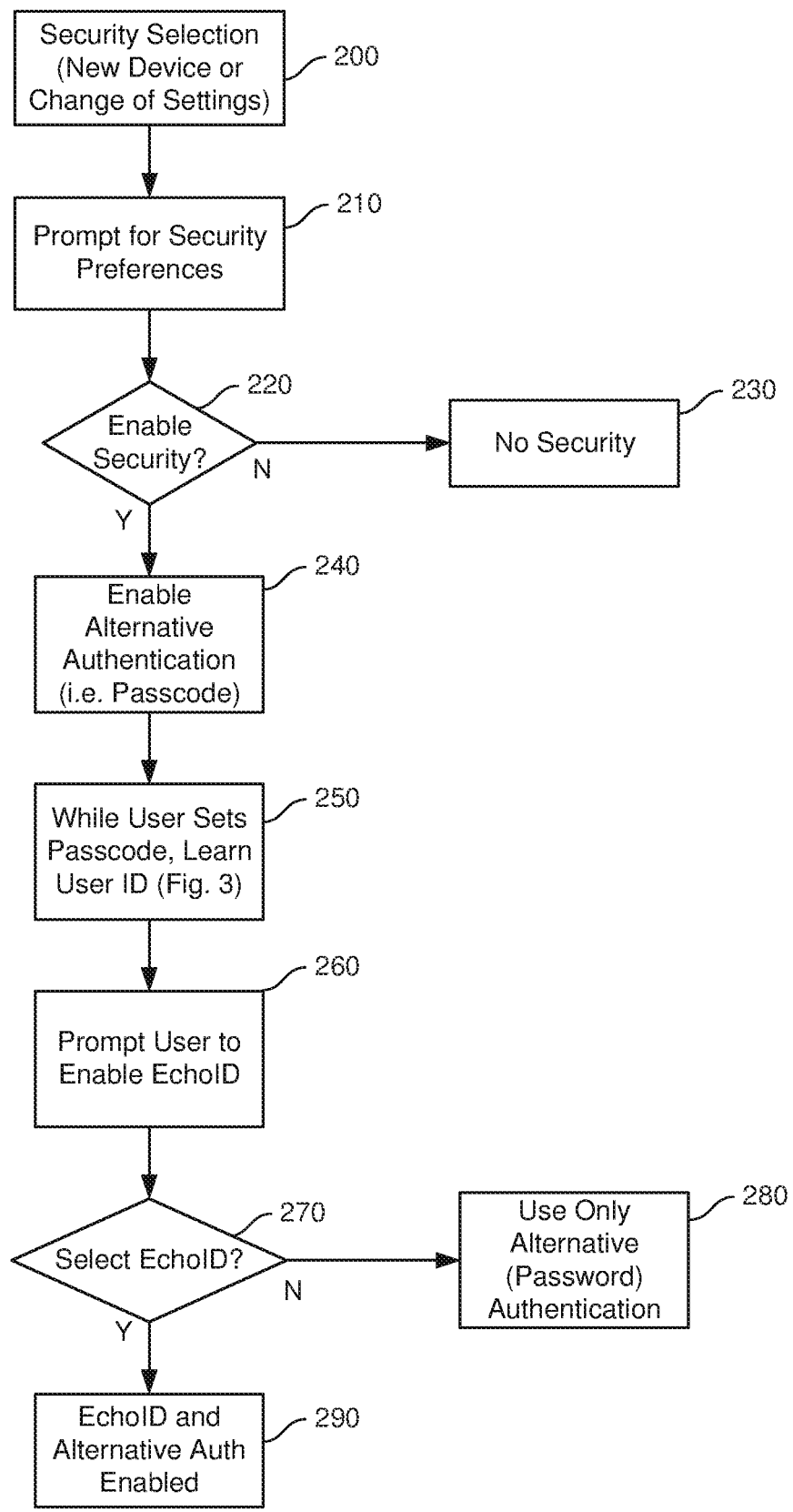
FIG. 2A is a flowchart illustrating a selection process for determining a type of authentication to use with a processing device.
Figure 2B:
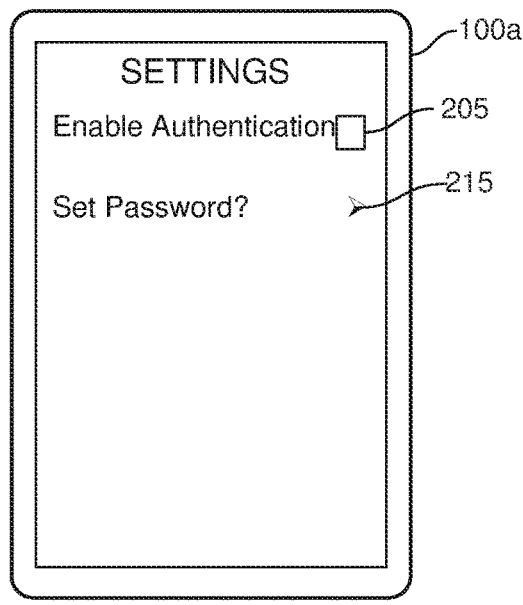
FIGS. 2B-2D are depictions of user interfaces illustrating a set-up process for a processing device.
Figure 2C:
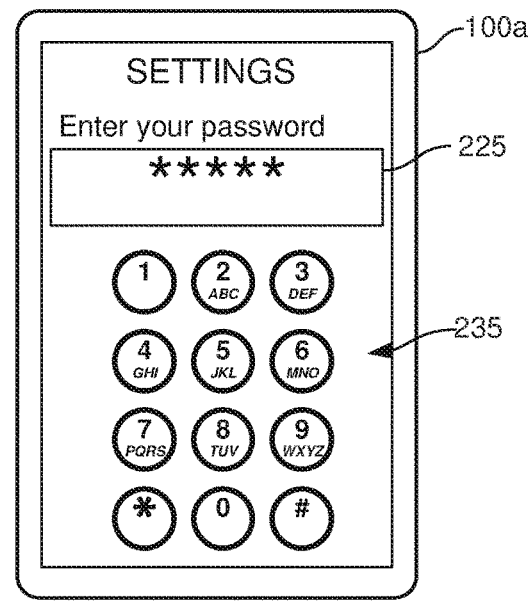
Figure 2D:
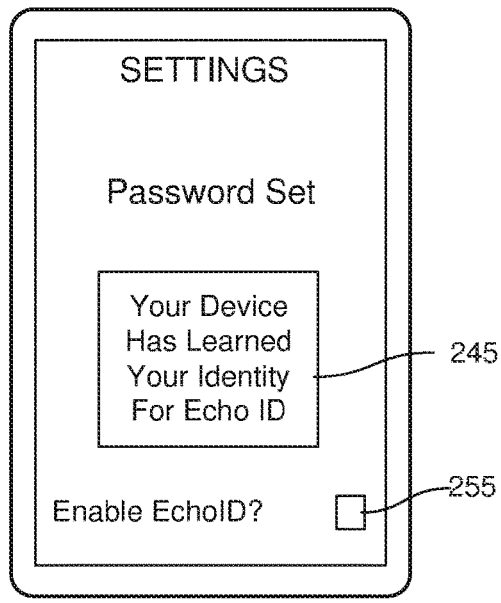

FIG. 2A illustrates a method allowing a user to select the type of security authentication they wish to utilize in a processing device. Initially, at 200, a security selection operation is performed. FIGS. 2B-2D illustrate exemplary user-interfaces on a processing device (displayed, for example, on a display 852 of a mobile device 800 of FIG. 8). The interfaces may be created by the user interface generator 170. The security selection operation can be performed by a user accessing a processing device user interface settings screen to change a securities selection, or may be automatically generated when a user accesses a processing device for the first time. For example, the process of FIG. 2A may be performed during an initial device set-up process, or at some point after a user has been operating a device and decides that they wish to switch authentication modes.

At 210, a user may be prompted for a selection of security preferences. The prompt may take any form of display in a user interface provided on a display device associated with the processing device. Device 100a may be a processing device such as device 800 illustrated in FIG. 8. In one embodiment, a SETTINGS prompt may comprise a check box which the user selects to "enable authentication", and an option may be provided to allow the user to set a numeric or alphanumeric password. On a touch screen interface such as that illustrated in FIG. 8, a user may touch a check box 205. As illustrated in FIG. 8, a display may be integrated in a housing with processing device, or provided separate from a housing of the processing device. Once prompted at 210, the user may select to enable security at 220 by, for example, touching check box 205. If the user does not select to enable security at 220, then no security may be utilized with the processing device at 230. If the user selects to enable security at 220, and the user may select to enable a passcode at 240. In the user interface of FIG. 2B, this may be performed by selecting arrow 215 which provides a user interface such as that shown in FIG. 2C.

In one embodiment, at 250, while the user enters a passcode in the UI of FIG. 2C, an echoprint model for the user is trained. Training can occur during a period beginning with the selection of the enable authentication check mark 205, or beginning when the user selects the arrow 215. The period may continue while the user keys in the password using a keyboard 235 through to the point that a prompt (illustrated in FIG. 2D) is shown to the user (or any sub-period of the foregoing period).

Once the user completes entering the passcode at 250, a prompt is issued at 260. The prompt is illustrated at FIG. 2D. As shown therein, the user interface may indicate a "password set" and contain a prompt 245 encouraging the user to enable EchoID and a check interface 255 allowing the user to enable selection of EchoID in addition to the passcode authentication.

Figures 3, 4:
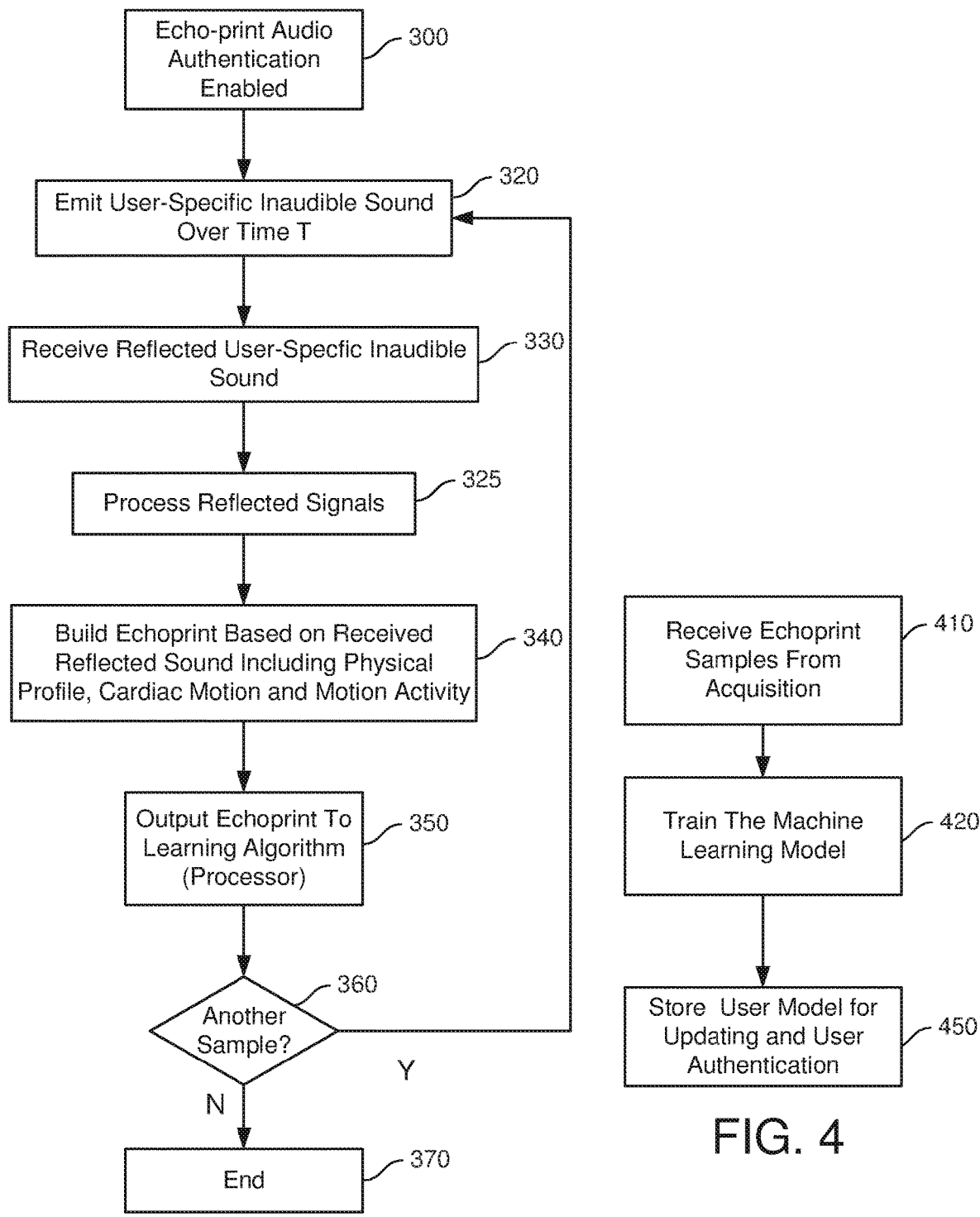
FIG. 3 is a flowchart illustrating a process of acquiring an audio reflection based echo signature.
FIG. 4. is a flowchart illustrating building a user model using machine learning.

Audio-based authentication or EchoID as discussed herein is based on sampling inaudible sound reflections of an emitted unique and user-specific signal. FIG. 3 illustrates one method for outputting and receiving reflections to create an echoprint for use in the audio-based authentication herein.

Initially, echoprint audio authentication is enabled at 300. As discussed above, the user may have various options to enable various types of authentication within the processing device.

At 320, a user-specific inaudible sound is emitted over a particular period of time T. The emitted sound at 320 is unique to each device. The uniqueness of the sound signal allows the technology to isolate reflected sounds in creating the echoprint. The period of time T may be alternatively referred to as the sample period and may range from nano-seconds to multiple seconds. At 330, the processing device receives reflected user-specific inaudible sounds for a time T. The receipt time may be time shifted with respect to the initial emission time of the sound signal at 320. The reflections or echoes will, after processing at 325, show characteristics of a user which illustrate unique physical characteristics, including cardiac motion, and biometric (human shape) data, and human motion activity. At 340 the method builds an echoprint based on the received reflected sound and identifies data samples which are unique to a user. At 350, the echoprint is output to a machine learning algorithm or stored in a training data set which may implemented by the learning processor or stored in a training data set for later use by the learning processor.

At 360, a determination is made as to whether additional samples should be acquired. If an additional sample is to be acquired, then the method returns to step 320 and steps 330, 340, 350 and 360 are repeated. Generally, multiple samples are acquired to statistically create the echoprint model. To perform an authentication, one or many samples over multiple sampling periods may be acquired before testing the samples to the echoprint model for a user.

If no additional samples are to be acquired, the method ends at 370. After a sufficient number of samples has been acquired, a user-specific echoprint model may be created.

FIG. 4 illustrates a method of building a user-specific model for the echoprint characteristics of an individual user. At 410, echoprint samples output by step 350 are received by a learning process or processor. The echoprint samples are associated desired output results for both echoprints identifying a user and echoprints which do not identify a user into one or more test data sets. At 420, a user echoprint model is calculated which characterizes those features uniquely associated with a user. The model may be created by machine learning using any of a number of known machine learning techniques.

Any of multiple machine learning techniques can be utilized in the present technology. Each authorized user for whom the training data is available will have a model developed specifically for the user.

Figure 5:
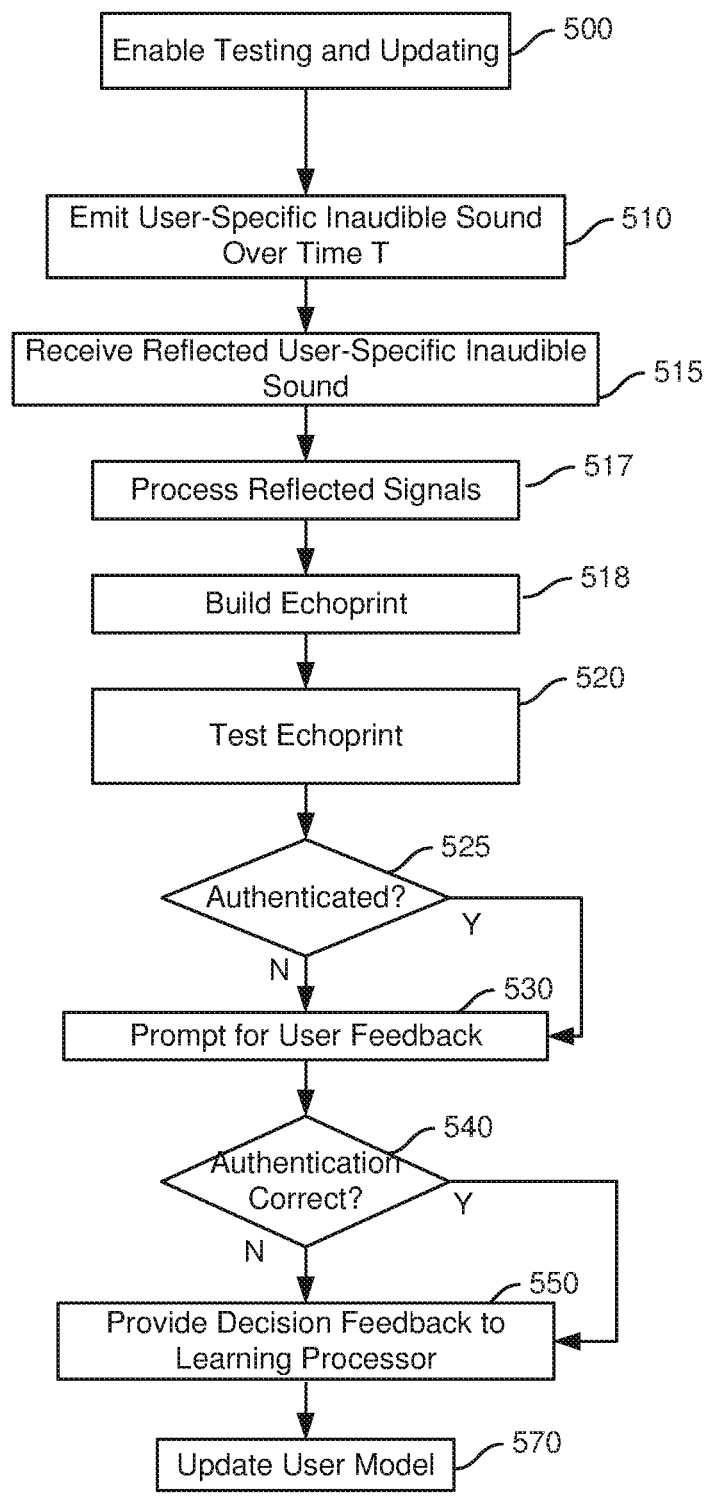
FIG. 5 is a flowchart illustrating testing and updating of a user echoprint model.

At 450, the model is stored and may thereafter be subjected to use in testing new samples to authenticate a user and may be updated by the learning processor using a method in accordance with FIG. 5

Creation of an echoprint and an echoprint model may take many forms. In one embodiment, an echoprint is a set of data comprising an N-dimension vector. Each dimension may represent a feature or an element of a feature. Building an echoprint may comprise mapping the sound signal to this set of data.

Once a user-specific model has been created, the model may be updated based on user feedback relative to the accuracy of the authentication the audio-based authentication makes.

FIG. 5 illustrates a method for testing and updating a user-specific echoprint model. At 500, the testing and updating process is enabled in the machine learning processor or as a process in a general-purpose processor. During the testing process, at 510, a user-specific inaudible sound signal is emitted over time T. At 515, reflections of the emitted user-specific inaudible sound emitted at 510 is received. Signal processing occurs at 517 and an echoprint is built for the reflected signal at 518. Signal processing is discussed with respect to FIG. 6B. At 520, the echoprint is tested by the current version of the user-specific echoprint model. Based on the test, an authentication determination is made at 525. If the user is authenticated, or if the user is not authenticated, a prompt to the user is made at 530 to determine whether the authentication which was decided at 525 was correct. If the authentication was correct or incorrect, at 540, the decision feedback 550 is provided to the learning processor. The learning processor receives the decision feedback at 560 and the correct or incorrect decision feedback is used to update a current version of the user-specific echoprint model at 570.

Figure 6A:
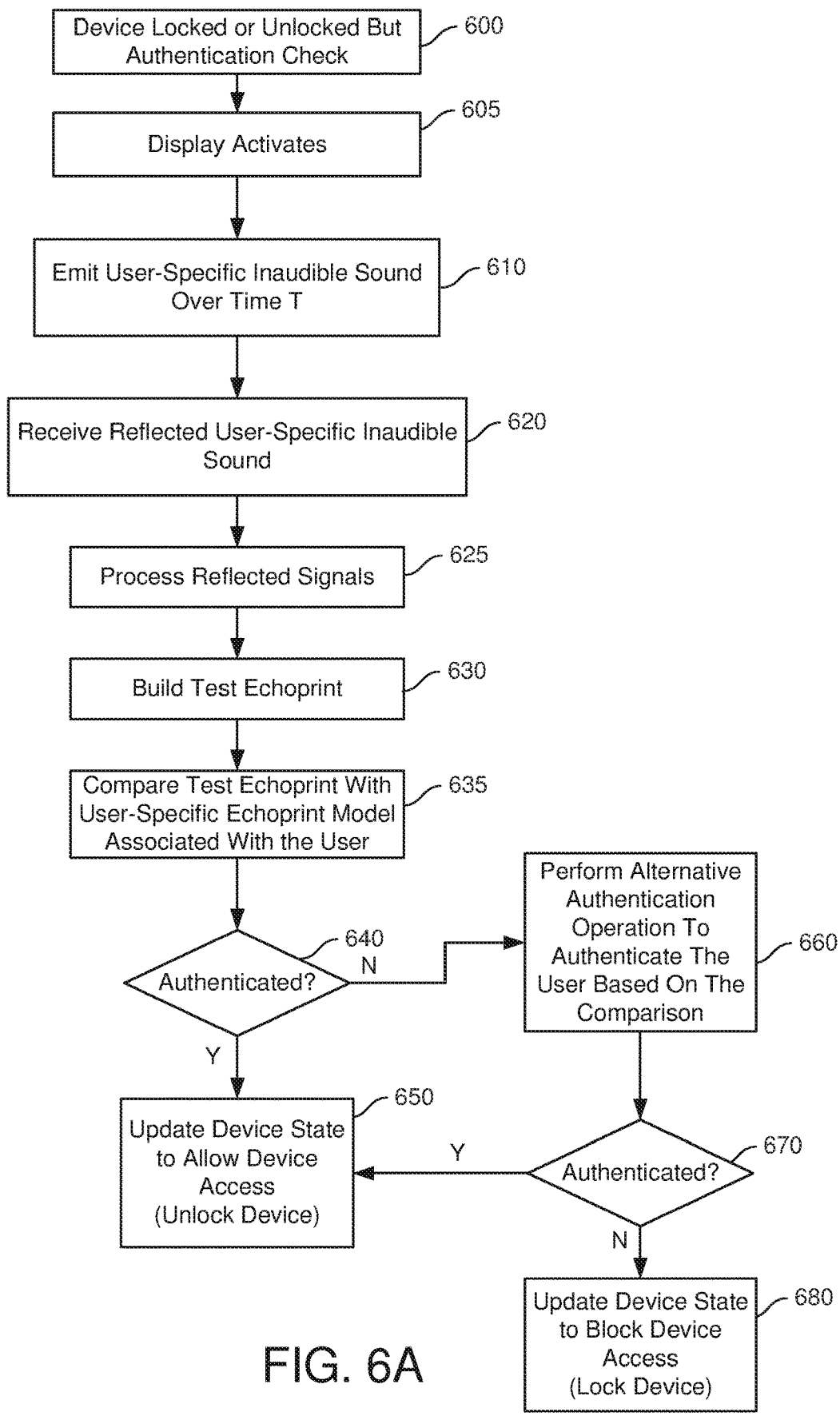
FIG. 6A illustrates an authentication process in accordance with the technology.

FIG. 6A illustrates a method which may be performed by the testing processor to authenticate a user for access to a processing device. As further illustrated in FIG. 7, the testing method may be dependent on a device state which reflects whether the display is on or off and whether the device is locked or unlocked. At 600, a device may be locked state which would require authentication for a user to access the device. The device may also be unlocked but may be set to periodically check authentication even when unlocked, hence starting the process flow of FIG. 6A. A user may engage with the phone to access the processing device though a number of means which will activate the device display at 605. For example, the user may press a physical button on the processing device, the user may lift the device, or the user may initiate a key sequence on a keyboard of the processing device. Steps 610-640 provide an audio authentication process using a test echoprint. At 610, a user-specific inaudible sound is emitted for a sampling period. At 620, the user-specific inaudible sound reflections are received. At 625, the reflected signals are processed to extract and isolate characteristics of the reflected signal indicating specific user biometric and behavioral characteristics. A method for processing the signals is illustrated in FIG. 6C. At 630, a test echoprint is built. At 635, the echoprint is tested by comparing the echoprint to the current version of the unique user model. At 635, the process compares the test echoprint with a user-specific echoprint model associated with the user. At 640, a determination is made based on the testing result. If so, the user is authenticated at 640, and at 650, device access is provided by updating the device state to allow device access such that the device is either unlocked or remains unlocked at 650. If the test result is negative, at 640, then the user is not authenticated by audio-based authentication and at 660, an alternative form of authentication (if enabled) is provided to the user. At 660, the alternative authentication operation is performed to authenticate the user based on the comparison at 635. If the user passes the alternative form of authentication at 670, then access is provided at 650 by updating the device state. If the user does not pass the alternative authentication at 670, then device access is blocked at 680 (i.e. the device is locked) by updating the device state.

Optionally, steps 610-640 may be repeated one or more times with the same or a different user-specific sound to attempt to authenticate the user. These steps may be repeated after a failed attempt to authenticate a user.

Figure 6B:
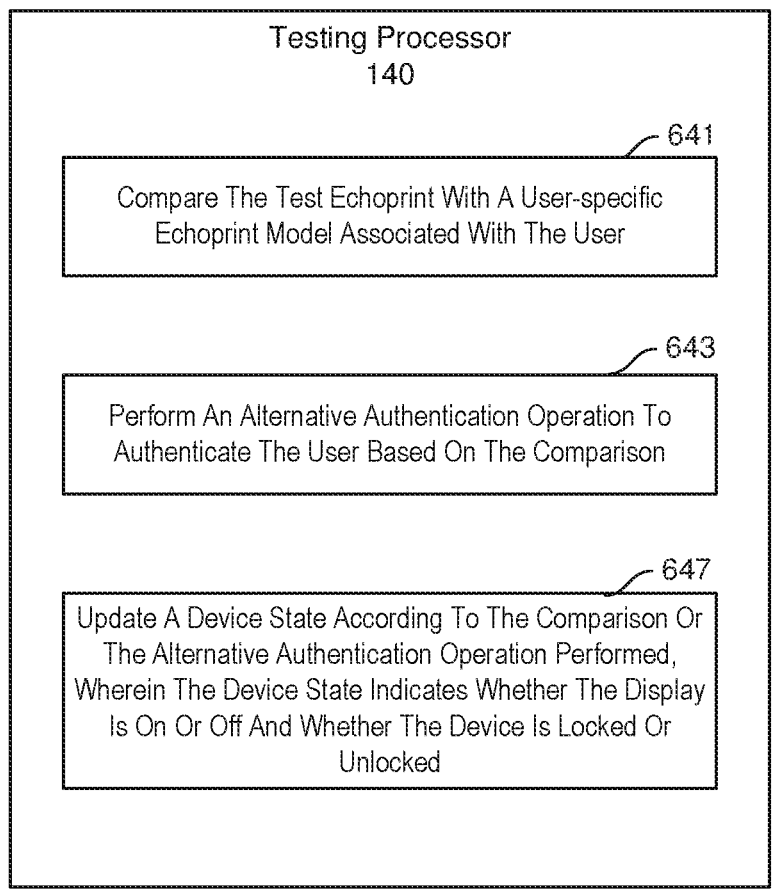
FIG. 6B illustrates one embodiment of a testing processor suitable for implementing at least a portion of the process of FIG. 6A.
Figure 6C:
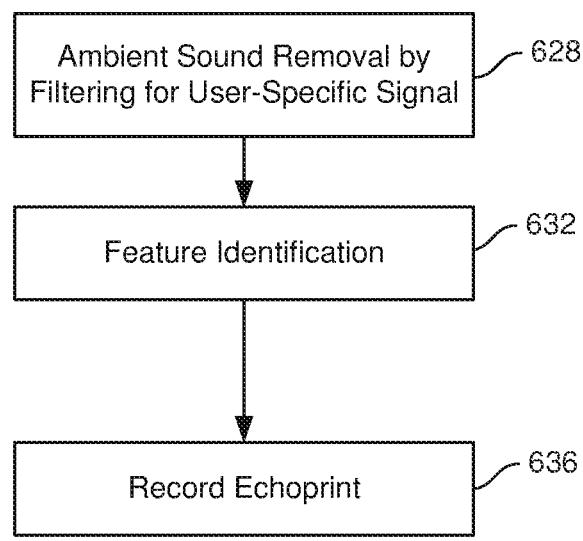
FIG. 6C illustrates one alternative for the processing of reflected signals in step 625 of FIG. 6A.

Steps 635-680 may be performed by the testing processor 140 and one embodiment of a testing processor 140 suitable for performing steps 635-680 is illustrated in FIG. 6B. This testing processor 140 includes code operable to instruct the processor or processing circuitry specifically implemented to compare the test echoprint with a user-specific echoprint model associated with the user at 641. This testing processor 140 includes code operable to instruct the processor or processing circuitry specifically implemented to perform an alternative authentication operation to authenticate the user based on the comparison at 643. This testing processor 140 includes code operable to instruct the processor or processing circuitry specifically implemented to update a device state according to the comparison or the alternative authentication operation performed, wherein the device state indicates whether the display is on or off and whether the device is locked or unlocked at 647.

FIG. 6C illustrates a method of processing a signal in accordance with step 630. At 628, ambient sound inputs are removed. In one embodiment, ambient sound may be removed. In one embodiment, ambient sounds may be removed by filtering for reflections at the user-specific sound signal.

Feature identification may occur at 632 and involves creating a set of data to train the machine learning model at 420. Each dimension of the set of data corresponds to a feature. An echoprint is recorded as a set of data at 636.

A processing device may not require a user to authenticate each time the user unlocks or operates the electronic device. In some embodiments, the computing device may allow a user to authenticate after a particular amount of time. The processing device may retain the user's authentication for a particular amount of time after having received the user's last instruction or having entered a stand-by mode. The amount of time the computing device retains authentication information may be set by the device or by the user.

Figure 7:
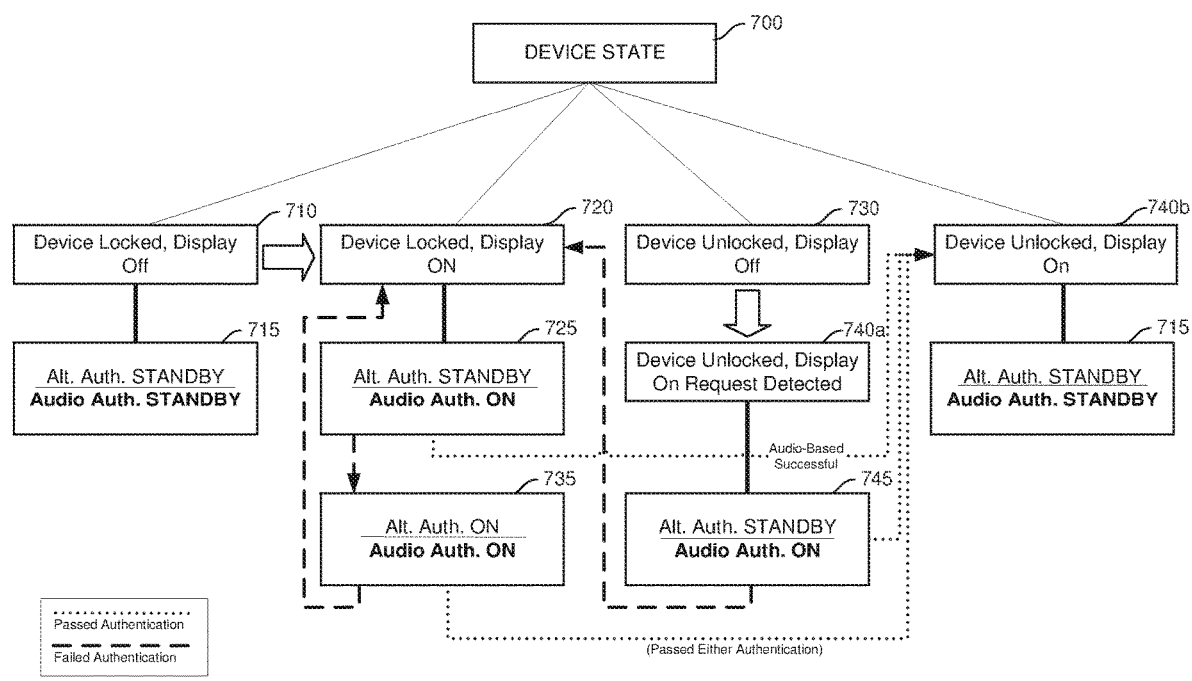
FIG. 7 illustrates a status of an audio authentication method and an alternative authentication method based on the display state and the locked vs. unlocked state of the processing device.

FIG. 7 illustrates the on and standby states of two types of authentication which may be in simultaneous use on a processing device. Audio-based authentication such as that described above, may be simultaneously used with an alternative authentication method (such as fingerprint recognition or a passcode) to provide a user more convenience and ease in device operation. Various device status states 710, 720, 730, and 740*b* are shown. These four device states reflect whether the device is locked or unlocked, and whether the device display is on or off. The four possible device states are: device locked and display off 710, device locked and display on 720, device unlocked and display off at 730 and device unlocked and display on at 740*b*. For each device state, the status of each authentication mechanism is shown. Two dashed lines illustrate how device state and authentication method states change based on successful or unsuccessful authentication.

Typical processing devices include both power management functions and security locking functions. Power management functions include options settable by the user to conserve device power by, for example, dimming or turning off a display after a set time period of inactivity. Similarly, security settings allow a user to set both whether a device should be locked and how long after inactivity an unlocked device should re-lock itself. It is possible that power settings may turn off a device display before the security settings re-lock a device, resulting in a state (730) where a device can be unlocked but the display is off. If the display is turned on at state 730 (e.g. in response to detecting a display screen touch or a user command via a device button), the device may optionally utilize the audio authentication to re-verify (transparently to the user) that an authenticated user is accessing the device. In state 740*b*, one form of authentication has successfully completed (as explained below) so no additional authentication is needed.

At 710, the device is locked, and the display is off. This state may occur when a device is unused (for example, when the device is at rest and power management functions in the device turn the display off). In this device state, the alternative authentication method is in standby and audio-based authentication is off at 715. The state of "standby" means that the authentication method is not functioning but has been activated in the device setting by a user. As noted above, a user may have a choice not to activate any authentication or device locking at all, or may choose not to enable audio authentication and use some other form of authentication. The flowchart of FIG. 7 illustrates that both authentication methods are enabled, but not necessarily active or in use (i.e. ON).

When the device is locked and the display is off (at 710), both authentication methods are in STANDBY mode. In STANDBY mode, the audio authentication method is not outputting an inaudible signal and each of the processors may be powered down or off, in order to provide power efficiency.

At 720, the device state is that the device is locked and the display is on. A device display may be activated when a user interacts with the device through a physical interaction mechanism such as a physical button, or by moving the device which is detected by one or more motion sensors in the device. Once the display is on, the device state is such that it is assumed the user will likely need to access the locked device. Hence, the audio-based authentication is enabled or turned on at 725 and begins attempting to authenticate the user, while the alternative authentication method remains in standby at 725. This allows unlocking of the device using the audio-based authentication method, if successful, prior to any indication to the user that the alternative form of authentication may be needed. If authentication is successful using the audio-based method at 725, then the device is unlocked and the display remains on at 740*b*. If authentication is unsuccessful using the audio-based authentication method at 725, then at 735, the audio-based authentication method remains on (and continues attempting to authenticate the user) and the alternative authentication method is turned on. At 735, the user may be prompted with a message on the display indicating that attempts to authenticate the user using audio-based authentication have failed and prompting the user to use the alternative form of authentication.

If authentication is unsuccessful under both methods, then the device remains in the locked state at 720 with the display on. If device authentication is successful under either method 735, then the device is unlocked and the display is turned on at 740*b*.

Once the device is unlocked and the display on at 740*b*, both authentication methods may enter the standby mode at 715.

State 730 illustrates a state where the device is unlocked and the display is off. As noted above, this may occur when the device power settings cause the display to turn off after a shorter period of time than the device security settings would cause the device to re-lock access to the device. The state of the device will change from that at 730 to a state where the device is unlocked but the display is on at 740*a* with detection of user interaction with the device such as that described above. In this state, at 745, the audio-based authentication may be active to re-lock the device should the authentication method detect that the user interaction is not by an authenticated user. For example, if an authorized user unlocks the device, but then leaves the device and an unauthorized user picks up and attempts to access the device, the audio-based authentication can re-lock the device (return to state 720). If the audio-based authentication errs at 745 (and an authorized user is indeed interacting with the device), the method follows the flow from 720-735 allowing the user to authorize access in the manner described above. If an authorized user interacts with the phone at 740*a*, the audio-based authentication may authorize the user at 745 and the device will be unlocked with the display on at 740*b*.

The audio-based authentication (e.g. generating an inaudible signal, creating a test echoprint and comparing/testing the created test echoprint with a user specific echoprint model) or other applicable automatic authentication may be performed in a manner unaware to a user of the device. A registered or authorized user of the device may be automatically authenticated to unlock a device (e.g. turning on a display showing a working user interface of an application previously used) without a need to perform an alternative authentication operation which may require user interface operations (e.g. via a display or microphone etc.) before the user can access the previously used application. As a result, a device can activate power saving mode (e.g. display auto off) and/or security protection (e.g. auto locking) mechanisms more often or more effectively without affecting the user experience.

FIG. 8 depicts an example of typical architecture for a mobile processing device phone. The mobile processing device 800 has memory 810, a physical connector 820, processor 840, an input/output (I/O) controller 850, a cellular radio channel and data channel 860, and power controller 870. Each of these components is connected through the system bus (not shown) of the mobile processing device 800.

Memory 810 includes the mobile processing device's operating system 812, applications 814, and non-volatile storage 830. Memory 810 can be any variety of memory storage media types, including non-volatile and volatile memory. The operating system 812 handles the different operations of the mobile processing device 800 and may contain user interfaces for operations, such as placing and receiving phone calls, text messaging, checking voicemail, and the like. The applications 814 can be any assortment of programs, such as a camera application for photos and/or videos, an address book application, a calendar application, a media player, an internet browser, games, an alarm application, other third-party applications, and the like. The applications can include a signal processor application 110a adapted to perform the functions of the signal processor 110 when executed by the processor 840, a learning processor 120a adapted to perform the functions of the learning processor 110 when executed by the processor 840, and a testing processor 140a adapted to perform the functions of the testing processor 110 when executed by the processor 840. In particular, the applications may include code 842 adapted to compare a test echoprint with a user-specific echoprint model associated with the user. The applications may further include code 844 adapted to perform an alternative authentication operation to authenticate the user based on the comparison at 842. The applications may further include code 846 adapted to update a device state according to the comparison or the alternative authentication operation performed, with the device state comprising whether the display 852 is on or off, and whether the device is locked or unlocked. The non-volatile storage component 830 in memory 810 contains data such as web caches, music, photos, contact data, scheduling data, and other files, as well as echoprints and the user-specific echoprint model.

The operating system 812 manages the hardware of the mobile processing device 800, including hardware such as the display/touchscreen 852, speaker 104, and microphone 102. The operating system 812 also manages software (i.e. applications 814) on the mobile processing device 800 for performing tasks requested by the user and handling incoming data, for example. This occurs through the operating system's control and allocation memory (i.e. RAM), system tasks, system resources, files systems, and the like. The processor 840 executes operations for the mobile processing device according to this control and allocation.

The power controller 870 of the mobile processing device 800 allocates power from the mobile processing device's power supply 872 to the circuitry for different mobile processing device components used to operate the mobile processing device 800 and its different features.

Additionally, the physical connector 820 can be used to connect the mobile processing device 800 to an external power source, such as an AC adapter or powered docking station.

The mobile processing device 800 also contains a cellular radio channel and data channel 860 for receiving and transmitting data, such as phone calls, text messages, email, webpage data, and the like. Cellular radio communication can occur through any of the standard network protocols of mobile processing device communication (i.e. GSM, PCS, D-AMPS, UMTS, and the like). The mobile processing device 800 may also contain additional communication channels 862, such as Wi-Fi, Bluetooth, and the like, for receiving and transmitting data as well. The mobile processing device 800 may have additional functional elements for communication 864, such as GPS. Each of the described communication mediums is accessed via the antenna 866 on the mobile processing device 800. The communication mediums for operations of the mobile processing device 800 are not limited to the mediums described and can include any other communication mediums known in the art.

It should be recognized that any suitable processing device, mobile or otherwise, may implement the present technology. Hence, although FIG. 8 illustrates a mobile device, similar components to those illustrated in FIG. 8 may be provided in a general purpose processing device such as a desktop computer, laptop computer.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

In one embodiment, the technology may be implemented by a means for outputting an inaudible user-specific sound signal at a frequency from a speaker associated with the processor, such means including by way of example a user-specific audio generator 150. The technology may include means for receiving reflections of the inaudible sound signal such means including, by way of example, a microphone and signal processor. The technology may include means for generating an echoprint based on the reflections and associating the echoprint with a user which may comprise, by way of example, a signal processor 110. The technology includes means to authenticate a user to provide access to a processing device including by way of example, a testing processor.

Some embodiments herein may be implemented in computer-readable non-transitory media that includes all types of computer readable media, including magnetic storage media, optical storage media, and solid state storage media and specifically excludes signals.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processing device having audio-based authentication, comprising:
   a display;
   a microphone configured to receive sound from an environment of the device;
   a speaker configured to emit sound into the environment; and
   one or more processors configured to cause the device to:
      output a first sound signal from the speaker;
      receive, at the microphone, a first reflection of the first sound signal reflected by a user;
      store information based on the first reflection;
      cause the device to build a user specific audio signature from at least the first reflection;
      output a second sound signal from the speaker;
      receive, at the microphone, a second reflection of the second sound signal;
      compare the second reflection with the stored information; and
      update a device state according to the comparison of the first and second reflections;
      wherein each sound signal output from the speaker is inaudible.

2. The processing device of claim 1 wherein the information stored comprises a user-specific reflection signature model for the user.

3. The processing device of claim 2 wherein the first reflection is received during a sample period and the second reflection is received over a second period, and each reflection includes reflected sound which varies with motion of the user during each period.

4. The processing device of claim 1 wherein the user specific audio signature is built using a machine learning process, the machine learning process building a user-specific audio signature model comprising the stored information.

5. The processing device of claim 4 wherein the one or more processors are configured to:
   output a plurality of sound signals and receive, for each of the plurality, a reflection of the sound signal; and
   generate, for each reflection, a user-specific audio signature thereby providing a plurality of user-specific audio signatures;
   wherein each of the plurality of user-specific audio signatures is input to the machine learning process to build the user-specific audio signature model.

6. The processing device of claim 1, wherein when the device state is a locked state, the one or more processors are configured to: update the device state to an unlocked state if the comparison matches the second reflection to a user-specific audio signature model; and provide an alternative authentication method in the locked state if the comparison does not match the second reflection to a user-specific audio signature model.

7. The processing device of claim 1 wherein the one or more processors are configured to output the first sound signal and the second sound signal while simultaneously providing an alternative authentication method.

8. A processor implemented method for authenticating a user of a device, comprising:
   outputting a first sound signal from a speaker configured to emit sound into an environment of the device;
   receiving, at a microphone configured to receive sound from the environment, a first reflection of the first sound signal reflected by the user;
   storing information based on the first reflection;
   building a user specific audio signature from at least the first reflection;
   outputting a second sound signal from the speaker;
   receiving, at the microphone, a second reflection of the second sound signal;
   comparing the second reflection with the stored information; and
   updating a device state according to the comparing of the first and second reflections;
   wherein each sound signal output from the speaker is inaudible.

9. The processor implemented method of claim 8 further including generating from at least the first reflection a user-specific audio signature model for the user, the user-specific audio signature model comprising the stored information.

10. The processor implemented method of claim 9 wherein each sound signal is unique to the device.

11. The processor implemented method of claim 9 further including:
   outputting a plurality of sound signals and receiving, for each of the plurality of sound signals, a reflection of the sound signal; and
   generating, for each reflection, a user-specific audio signature thereby providing a plurality of user-specific audio signatures;
   generating the user-specific audio signature model using a machine learning process.

12. The processor implemented method of claim 8 wherein the device state is a locked state, and the method includes:
   updating the device state to an unlocked state if the comparing matches the second reflection to a user-specific audio signature model; and
   updating the device state to remain in the locked state while providing an alternative authentication method if the comparing does not match the second reflection to the user-specific audio signature model.

13. The processor implemented method of claim 8 further outputting the first sound signal and the second sound signal while simultaneously providing an alternative authentication method.

14. A non-transitory computer-readable medium storing computer instructions for authenticating a user of a device, that when executed by one or more processors, cause the one or more processors to perform the steps of:

outputting a plurality of first sound signals from a speaker configured to emit sound into an environment of the device;

receiving, at a microphone configured to receive sound from the environment, a plurality of first reflections of each of the first sound signals reflected by the user;

storing information based on the plurality of first reflections;

building a user specific audio signature from at least the first reflection;

outputting a second sound signal from the speaker;

receiving, at the microphone, a second reflection of the second sound signal;

comparing the second reflection with the stored information; and updating a device state according to the comparing of the first and second reflections wherein each of the plurality of first sound signals and the second sound signal, output from the speaker, are inaudible.

15. The non-transitory computer-readable medium of claim 14 wherein the one or more processors further perform the steps of:

generating a user-specific reflection signature model for the user and storing the user-specific reflection signature model as the stored information.

16. The non-transitory computer-readable medium of claim 14 wherein the one or more processors further perform the steps of:

generating, for each of the plurality of first reflections, a user-specific audio signature thereby providing a plurality of user-specific audio signatures;

generating a user-specific audio-signature model using at least some of the plurality of the plurality of user-specific audio signatures.

17. The non-transitory computer-readable medium of claim 14 wherein the one or more processors further perform the steps of:

providing an interface to configure a non-audio authentication method for the device; wherein the outputting the plurality of first sound signals and receiving the plurality of first reflections occurs while simultaneously providing the interface.

* * * * *